United States Patent
Leppänen et al.

(10) Patent No.: US 9,762,387 B2
(45) Date of Patent: Sep. 12, 2017

(54) DISCOVERY AND SECURE TRANSFER OF USER INTEREST DATA

(75) Inventors: Kari J. Leppänen, Helsinki (FI); Philip Ginzboorg, Espoo (FI); Janne Kulmala, Tampere (FI); Antti Laine, Tampere (FI); Marko Hannikainen, Pirkkala (FI)

(73) Assignee: Nokie Technologies Oy, Espoo (FI)

( * ) Notice: Subject to any disclaimer, the term of this patent is extended or adjusted under 35 U.S.C. 154(b) by 121 days.

(21) Appl. No.: 14/421,881

(22) PCT Filed: Sep. 13, 2012

(86) PCT No.: PCT/IB2012/054772
§ 371 (c)(1),
(2), (4) Date: Jul. 6, 2015

(87) PCT Pub. No.: WO2014/041397
PCT Pub. Date: Mar. 20, 2014

(65) Prior Publication Data
US 2015/0341169 A1    Nov. 26, 2015

(51) Int. Cl.
*H04L 9/08* (2006.01)
*H04W 12/04* (2009.01)
(Continued)

(52) U.S. Cl.
CPC .......... *H04L 9/0866* (2013.01); *H04W 12/04* (2013.01); *H04L 9/0869* (2013.01);
(Continued)

(58) Field of Classification Search
CPC . H04L 9/0838–9/0844; H04L 9/0861–9/0869; H04L 63/061; H04W 12/02–12/04
See application file for complete search history.

(56) References Cited

U.S. PATENT DOCUMENTS

| | | | |
|---|---|---|---|
| 8,837,736 B2* | 9/2014 | Garcia Morchon | .... H04L 9/083 380/279 |
| 2008/0049939 A1* | 2/2008 | Canetti | ................. H04L 9/0894 380/277 |

(Continued)

FOREIGN PATENT DOCUMENTS

WO    2009158656    12/2009

OTHER PUBLICATIONS

International Search Report and Written Opinion received for corresponding Patent Cooperation Treaty Application No. PCT/IB2012/054772, dated Sep. 10, 2013, 9 pages.

*Primary Examiner* — Linglan Edwards
*Assistant Examiner* — Kevin Bechtel
(74) *Attorney, Agent, or Firm* — Mintz Levin Cohn Ferris Glovsky and Popeo, P.C.

(57) ABSTRACT

A method for establishing an encrypted communication channel is described. Query IDs are generated at a first device. Each query ID identifies a keyword in a set of keywords. Query IDs are received, at a second device. A second set of keywords is determined by the second device based on the query IDs. Match IDs are determined based on the second set. Each match ID identifies a keyword in the second set. An encryption key is generated based on the second set. A response is sent which includes the match IDs and an encrypted message. At the first device, the second set is determined based on the match IDs. The second set includes keywords of the first set of keywords identified by the match IDs. The encryption key is generated at the first device and the encrypted message is decrypted. Apparatus and computer readable media are also described.

20 Claims, 5 Drawing Sheets

(51) Int. Cl.
  *H04L 29/06* (2006.01)
  *H04W 12/02* (2009.01)
  *H04W 84/18* (2009.01)
(52) U.S. Cl.
  CPC ...... *H04L 63/0435* (2013.01); *H04L 2209/80* (2013.01); *H04W 12/02* (2013.01); *H04W 84/18* (2013.01)

(56) References Cited

U.S. PATENT DOCUMENTS

| | | | |
|---|---|---|---|
| 2009/0327391 A1 | 12/2009 | Park et al. | |
| 2010/0098247 A1* | 4/2010 | Suumaki | H04L 9/0866 380/44 |
| 2011/0007639 A1 | 1/2011 | Richardson | |
| 2012/0158975 A1* | 6/2012 | Hogoboom | H04L 69/22 709/228 |
| 2012/0253835 A1* | 10/2012 | Tracy | G06F 19/322 705/2 |
| 2013/0166920 A1* | 6/2013 | Cousins | G06F 12/1408 713/189 |
| 2013/0272521 A1* | 10/2013 | Kipnis | H04L 9/085 380/44 |

* cited by examiner

DISCOVERY AND SECURE TRANSFER OF USER INTEREST DATA

RELATED APPLICATION

This application was originally filed as PCT Application No. PCT/IB2012/054772 filed Sep. 13, 2012.

TECHNICAL FIELD

The exemplary and non-limiting embodiments relate generally to wireless communication systems, methods, devices and computer programs and, more specifically, relate to establishing an encrypted communication channel based on user interest data.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

- AES advanced encryption standard, an encryption method
- ID identifier
- NFC near field communication
- PIN personal identification number
- SHA secure hash algorithm, a hashing algorithm
- UE user equipment, such as a mobile station or mobile terminal
- WLAN wireless local area network (see IEEE standard 802.11)

An ad hoc network can be formed when two or more devices move into reach of a communication signal, such as wireless local area network (WLAN) signals, Bluetooth signals, and other widely available direct communication technologies for example. Thus, wireless communications between mobile devices can be used to exchange information without relying on an existing infrastructure, such as cell networks or Internet services. The ad hoc network may use low-power radio communication so that the network can be used to continuously communicate with encountered devices in the background without having a large impact on the battery life. As the throughput of the network is limited, the protocols may be designed to minimize the amount of traffic. Some ad hoc networks can have a range that extends beyond the range of a single device by using a multi-hop mobile ad hoc network, where other devices participate in forwarding traffic within the network.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method for establishing an encrypted communication channel in an ad hoc network based on user interest data. The method includes generating at least one query ID based on a first set of keywords. Each query ID identifies a keyword of the first set of keywords. The method includes receiving, in an ad hoc network, a response including at least one match ID and an encrypted message. Each match ID identifies a keyword. The method includes determining a subset of keywords based on the at least one match ID. The subset of keywords includes keywords of the first set of keywords identified by the at least one match ID. The method also includes generating an encryption key based on the subset of keywords and decrypting the encrypted message using the encryption key.

In a further aspect thereof an exemplary embodiment provides a method for establishing an encrypted communication channel in an ad hoc network based on user interest data. The method includes receiving, in an ad hoc network, a query including at least one query ID. Each query ID identifies a keyword. In response to receiving the query, the method includes determining a subset of keywords from a first set of keywords based on the at least one query ID. The subset of the first set of keywords includes keywords of the first set of keywords which are identified by the at least one query ID. The method includes determining at least one match ID based on the subset of keywords. Each match ID identifies a keyword of the subset of keywords. The method includes generating an encryption key based on the subset of keywords. The method also includes encrypting a message using the encryption key and sending a response including the at least one match ID and the encrypted message.

In another aspect thereof an exemplary embodiment provides an apparatus for establishing an encrypted communication channel in an ad hoc network based on user interest data. The apparatus includes at least one processor; and at least one memory including computer program code. The at least one memory and the computer program code are configured to, with the at least one processor, cause the apparatus to perform actions. The actions include to generate at least one query ID based on a first set of keywords. Each query ID identifies a keyword of the first set of keywords. The actions include to receive, in an ad hoc network, a response including at least one match ID and an encrypted message. Each match ID identifies a keyword. The actions include to determine a subset of keywords based on the at least one match ID. The subset of keywords includes keywords of the first set of keywords identified by the at least one match ID. The actions also include to generate an encryption key based on the subset of keywords and to decrypt the encrypted message using the encryption key.

In a further aspect thereof an exemplary embodiment provides an apparatus for establishing an encrypted communication channel in an ad hoc network based on user interest data. The apparatus includes at least one processor; and at least one memory including computer program code. The at least one memory and the computer program code are configured to, with the at least one processor, cause the apparatus to perform actions. The actions include to receive, in an ad hoc network, a query including at least one query ID. Each query ID identifies a keyword. In response to receiving the query, the actions include to determine a subset of keywords from a first set of keywords based on the at least one query ID. The subset of the first set of keywords includes keywords of the first set of keywords which are identified by the at least one query ID. The actions include to determine at least one match ID based on the subset of keywords. Each match ID identifies a keyword of the subset of keywords. The actions include to generate an encryption key based on the subset of keywords. The actions also include to encrypt a message using the encryption key and to send a response including the at least one match ID and the encrypted message.

In another aspect thereof an exemplary embodiment provides a computer readable medium for establishing an encrypted communication channel in an ad hoc network based on user interest data. The computer readable medium is tangibly encoded with a computer program executable by a processor to perform actions. The actions include generating at least one query ID based on a first set of keywords. Each query ID identifies a keyword of the first set of keywords. The actions include receiving, in an ad hoc network, a response including at least one match ID and an encrypted message. Each match ID identifies a keyword. The actions include determining a subset of keywords based on the at least one match ID. The subset of keywords includes keywords of the first set of keywords identified by the at least one match ID. The actions also include generating an encryption key based on the subset of keywords and decrypting the encrypted message using the encryption key.

In a further aspect thereof an exemplary embodiment provides a computer readable medium for establishing an encrypted communication channel in an ad hoc network based on user interest data. The computer readable medium is tangibly encoded with a computer program executable by a processor to perform actions. The actions include receiving, in an ad hoc network, a query including at least one query ID. Each query ID identifies a keyword. In response to receiving the query, the actions include determining a subset of keywords from a first set of keywords based on the at least one query ID. The subset of the first set of keywords includes keywords of the first set of keywords which are identified by the at least one query ID. The actions include determining at least one match ID based on the subset of keywords. Each match ID identifies a keyword of the subset of keywords. The actions include generating an encryption key based on the subset of keywords. The actions also include encrypting a message using the encryption key and sending a response including the at least one match ID and the encrypted message.

In another aspect thereof an exemplary embodiment provides an apparatus for establishing an encrypted communication channel in an ad hoc network based on user interest data. The apparatus includes means for generating at least one query ID based on a first set of keywords. Each query ID identifies a keyword of the first set of keywords. The apparatus includes means for receiving, in an ad hoc network, a response including at least one match ID and an encrypted message. Each match ID identifies a keyword. The apparatus includes means for determining a subset of keywords based on the at least one match ID. The subset of keywords includes keywords of the first set of keywords identified by the at least one match ID. The apparatus also includes means for generating an encryption key based on the subset of keywords and means for decrypting the encrypted message using the encryption key.

In a further aspect thereof an exemplary embodiment provides an apparatus for establishing an encrypted communication channel in an ad hoc network based on user interest data. The apparatus includes means for receiving, in an ad hoc network, a query including at least one query ID. Each query ID identifies a keyword. The apparatus includes means for determining a subset of keywords from a first set of keywords based on the at least one query ID in response to receiving the query. The subset of the first set of keywords includes keywords of the first set of keywords which are identified by the at least one query ID. The apparatus includes means for determining at least one match ID based on the subset of keywords. Each match ID identifies a keyword of the subset of keywords. The apparatus includes means for generating an encryption key based on the subset of keywords. The apparatus also includes means for encrypting a message using the encryption key and means for sending a response including the at least one match ID and the encrypted message.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

In a non-limiting example, a user, Alice, has a first electronic device or user equipment (UE). The UE stores information regarding Alice's interests. Alice's UE uses this information in order to find other devices/users who share some of the same interest. Since Alice's UE may not have previously communicated with the other UEs, any security applied may be vulnerable to being overheard or even provided by a potential eavesdropper. Furthermore, in order to avoid disclosing personal information, Alice's disclosed interests are encoded so that only a device which knows the shared interest can determine if a match has been found.

Figure 1:
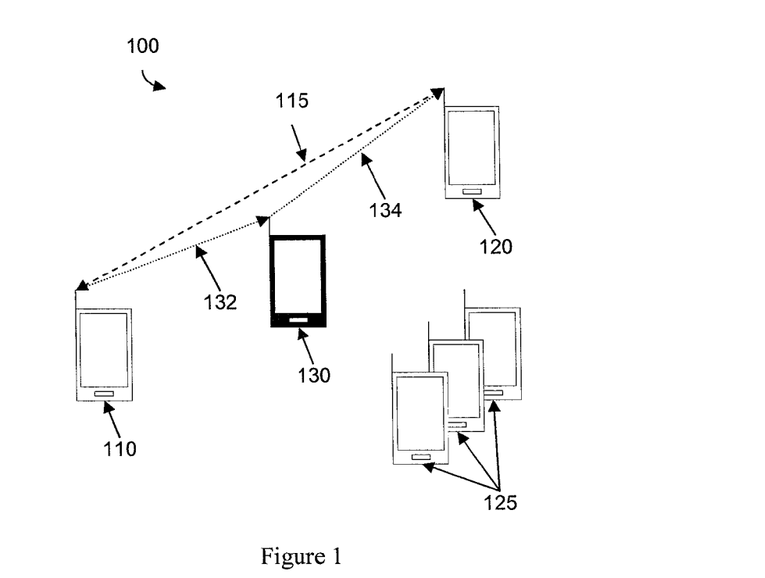
FIG. 1 depicts various electronic devices communicating in an ad hoc network in accordance with various exemplary embodiments.

FIG. 1 depicts various electronic devices communicating in an ad hoc network in accordance with various exemplary embodiments. A user, Alice, has a first electronic device, such as user equipment (UE) 110. A second user, Bob, has an electronic device, such as UE 120. Other users may be present, such as those with UEs 125, 130. The various UEs 110, 120, 125, 130 may communicate with each other using one or more communication technologies (such as WiFi, cellular, etc. for example).

Various communications may be broadcast or directed at one or more UEs 110, 120, 125, 130 (such as a multicast for example). A communication channel 115 between UE 110 and UE 120 may be described for a direct communication between the two UEs, 110, 120, as well as for a broadcast from UE 110 which is received at UE 120. Additionally, UEs 110, 120, 125, 130 may relay signals between various other UEs 110, 120, 125, 130. As a non-limiting example, UE 110 may provide a signal 132 which is received by UE 130 and resent as signal 134 to UE 120. Thus, channel 115 may either be a communication directly between UE 110 and UE 120 or a relayed communication through UE 130.

Figure 4:
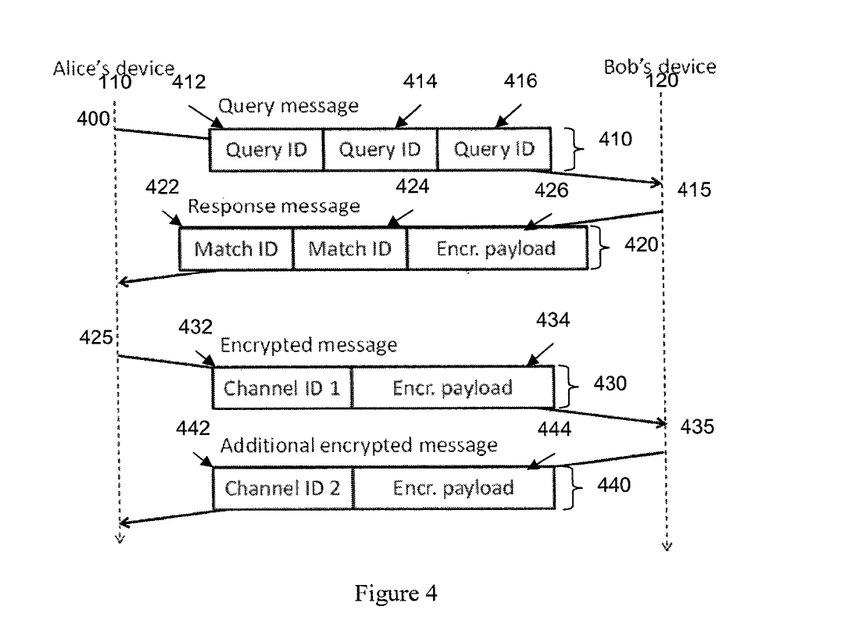
FIG. 4 shows a signaling diagram of a message exchange in accordance with various exemplary embodiments.

FIG. 4 shows a signaling diagram of a message exchange in accordance with the first exemplary embodiment. At point 400, Alice's device 110 sends a query message 410 which contains a set of query IDs 412, 414, 416. Bob's device 120 finds a matching subset of keywords, and sends a response message 420 that contains match IDs 422, 424, at point 415. In this non-limiting example, two of the three keywords identified in the query message 410 are matched at Bob's device 120. Thus, the response message 420 includes two match IDs 422, 424.

The response message 420 also contains a payload 426, which is encrypted. The encryption key is produced from the matching subset of keywords. The matching keywords are combined and hashed together to produce a longer string, which is used as the encryption key.

At point 425, the devices 110, 120 have identified a common set of keywords (such as the two keywords identified by match IDs 422, 424 as a non-limiting example) and can continue to communicate on the established channel. Alice's device 110 sends an encrypted message 430 to Bob's device 120. The encrypted message 430 includes an identifier of the channel (channel ID 1 432) and the payload 434.

Other devices that have seen the response message know to expect messages from the associated channel ID. For example, at point 435, Bob's device 120 can send an additional encrypted message 440 to Alice's device 110. The additional encrypted message 440 includes a second, different channel identifier, channel ID 2 442 as well as a payload 444.

Various exemplary embodiments find common information between two previously unacquainted devices; and use the found common information to form a secure communication channel between the devices. This allows the devices to hide the fact that common interests have been found (and the following exchange of messages) from external observers.

Figure 5:
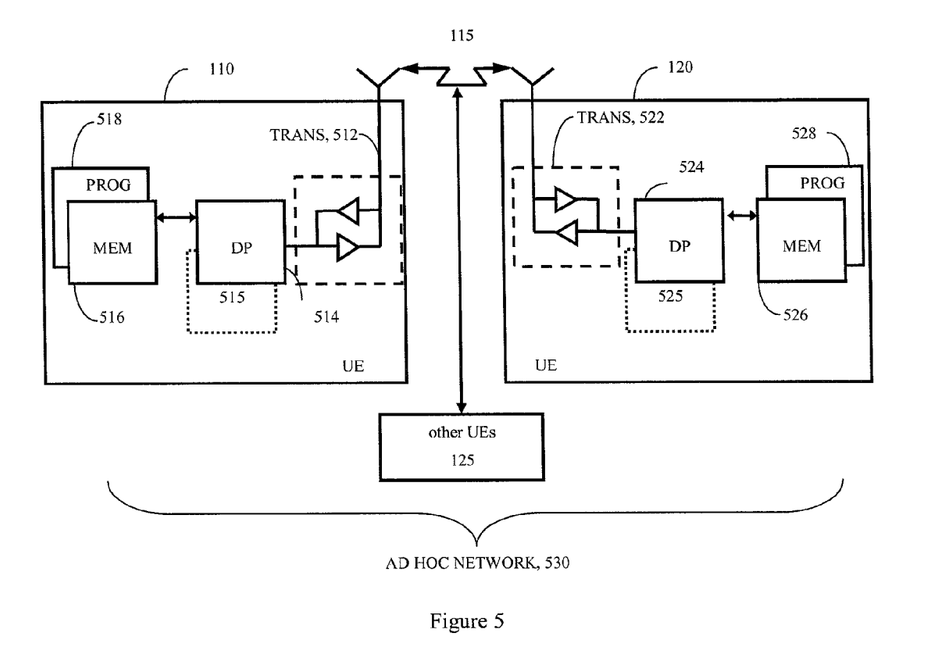
FIG. 5 shows a simplified block diagram of exemplary electronic devices that are suitable for use in practicing various exemplary embodiments.

FIG. 5 illustrates a simplified block diagram of various electronic devices and apparatus that are suitable for use in practicing exemplary embodiments. In the ad hoc network 530 of FIG. 5, a first user equipment (Alice's device) 110 is adapted for communication over a wireless link 115 with other devices, such as a second user equipment (Bob's device) 120 and other UEs 125.

The UE 110 includes a controller, such as a computer or a data processor (DP) 514, a computer-readable memory medium embodied as a memory (MEM) 516 that stores a program of computer instructions (PROG) 518, and a suitable wireless interface, such as radio frequency (RF) transceiver 512, for bidirectional wireless communications with the other devices via one or more antennas.

The second user equipment 120 also includes a controller, such as a computer or a data processor (DP) 524, a computer-readable memory medium embodied as a memory (MEM) 526 that stores a program of computer instructions (PROG) 528, and a suitable wireless interface, such as RF transceiver 522, for communication with the first UE 110 via one or more antennas. MEM 526 may also be configured to store data such as one or more look-up tables for example.

At least one of the PROGs 518 and 528 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 514 of the first UE 110; and/or by the DP 524 of the second UE 120, or by hardware, or by a combination of software and hardware (and firmware).

The first UE 110 and the second UE 120 may also include dedicated processors, for example ad hoc network protocol processors 515 and 525. These processors 515, 525 may be configured to handle the various communications through the ad hoc network.

In general, the various embodiments of the first UE 110, the second UE 120 and/or the other UEs 125 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 516 and 526 may be of any type suitable to the local technical environment and may be implemented using any suitable data storage technology, such as semiconductor based memory devices, flash memory, magnetic memory devices and systems, optical memory devices and systems, fixed memory and removable memory. The DPs 514 and 524 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 512 and 522) may be of any type suitable to the local technical environment and may be implemented using any suitable communication technology such as individual transmitters, receivers, transceivers or a combination of such components.

Based on the foregoing it should be apparent that various exemplary embodiments provide a method, apparatus and computer program(s) to establishing an encrypted communication channel in an ad hoc network based on user interest data.

Figure 6:
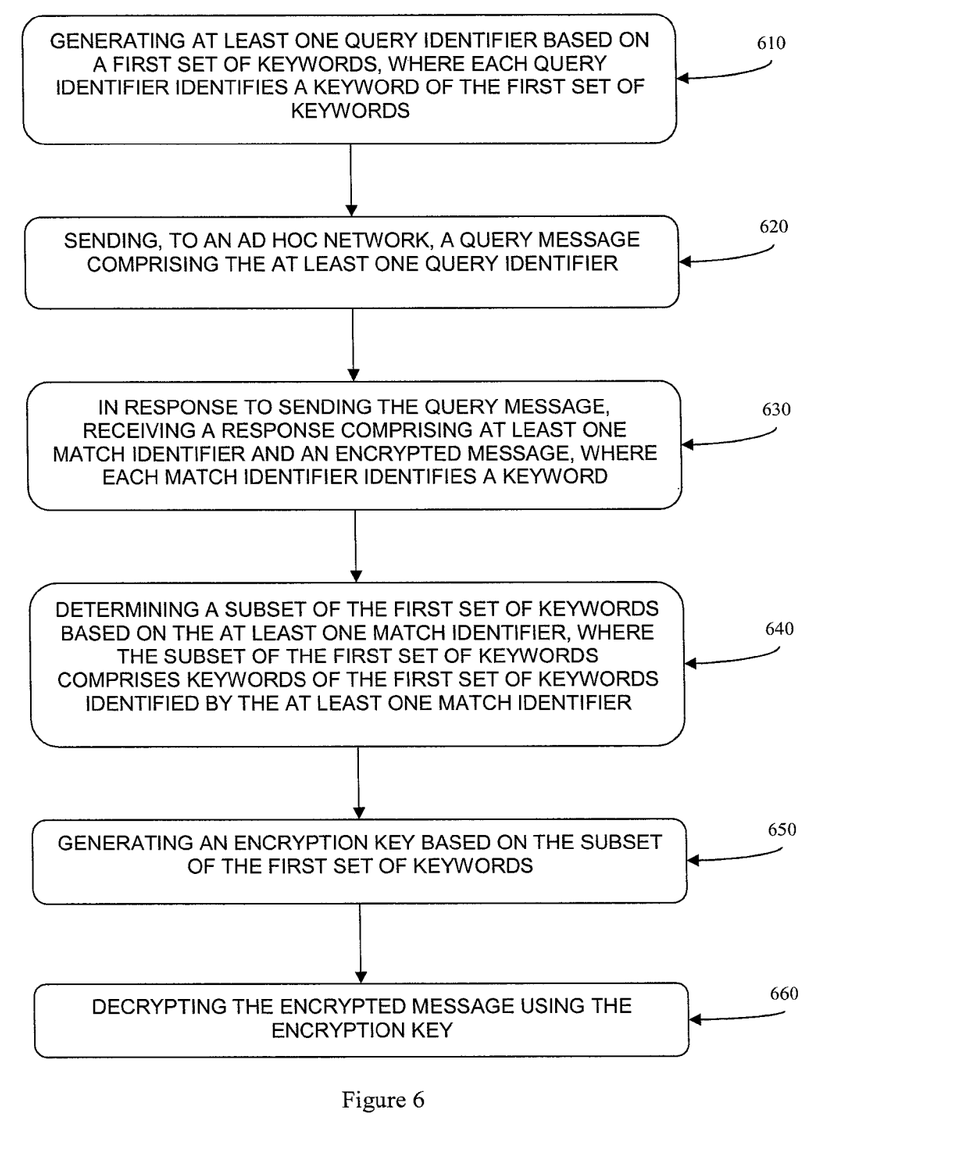
FIG. 6 is a logic flow diagram that illustrates the operation of an exemplary method, and a result of execution of computer program instructions embodied on a computer readable memory, in accordance with various exemplary embodiments.

FIG. 6 is a logic flow diagram that illustrates the operation of a method, and a result of execution of computer program instructions (such as PROG 518 for example), in accordance with exemplary embodiments. In accordance with these exemplary embodiments a method performs, at Block 610, generating at least one query identifier based on a first set of keywords. Each query identifier identifies a keyword of the first set of keywords. The method performs, at Block 620, sending, to an ad hoc network, a query message which includes the at least one query identifier. In response to sending the query message, the method performs receiving a response including at least one match identifier and an encrypted message at Block 630. Each match identifier identifies a keyword. At Block 640, the method performs determining a subset of the first set of keywords based on the at least one match identifier. The subset includes keywords of the first set of keywords identified by the at least one match identifier. The method also performs generating an encryption key based on the subset of the first set of keywords, at Block 650, and decrypting the encrypted message using the encryption key, at Block 660.

Figure 7:
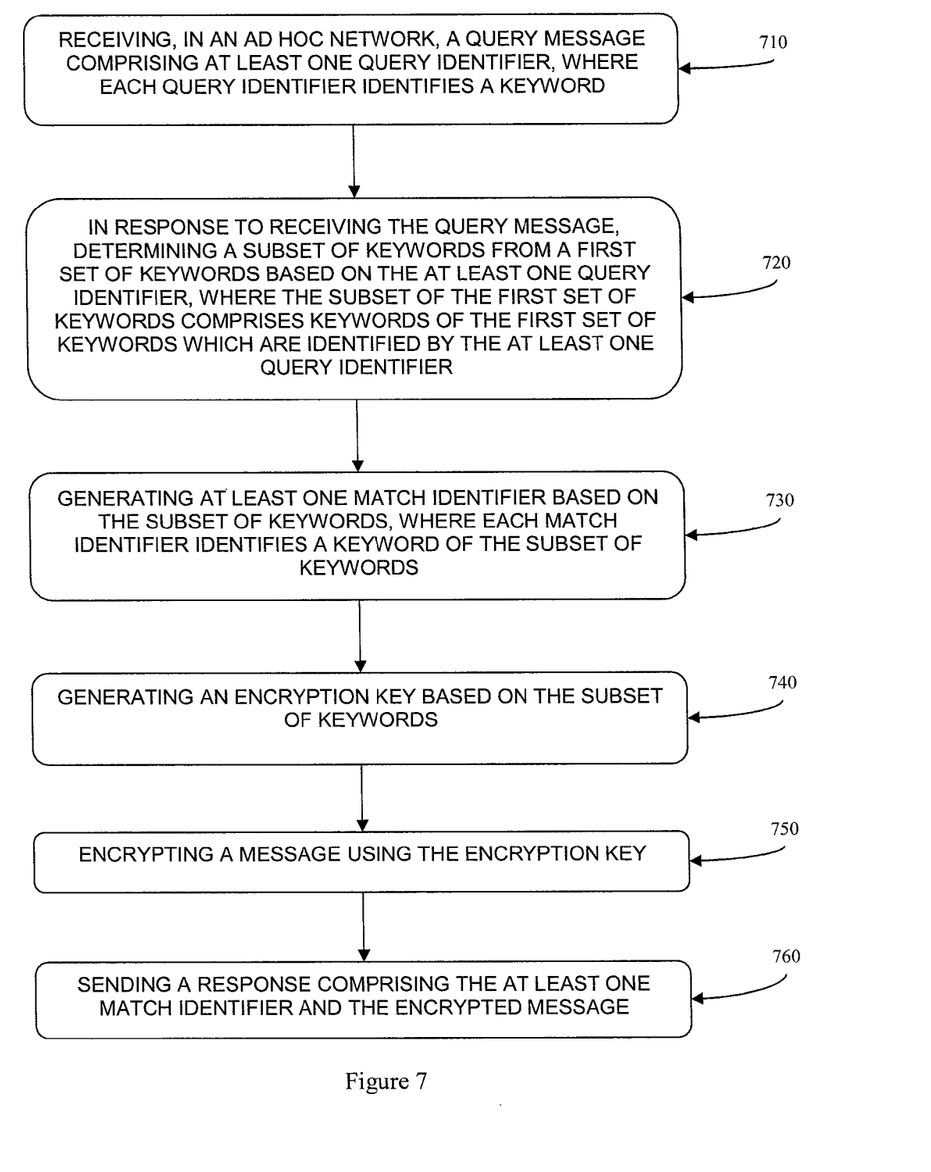
FIG. 7 is a logic flow diagram that illustrates the operation of another exemplary method, and a result of execution of computer program instructions embodied on a computer readable memory, in accordance with various exemplary embodiments.

FIG. 7 is a logic flow diagram that illustrates the operation of a method, and a result of execution of computer program instructions (such as PROG 528 for example), in accordance with exemplary embodiments. In accordance with these exemplary embodiments a method performs, at Block 710, receiving, in an ad hoc network, a query message which includes at least one query identifier. Each query identifier identifies a keyword. In response to receiving the query message, the method performs determining a subset of keywords from a first set of keywords based on the at least one query identifier, at Block 720. The subset of the first set of keywords includes keywords of the first set of keywords which are identified by the at least one query identifier. The method performs determining at least one match identifier based on the subset of keywords, at Block 730. Each match identifier identifies a keyword of the subset of keywords. At Block 740, the method performs generating an encryption key based on the subset of keywords. The method also performs encrypting a message using the encryption key, at Block 750, and sending a response comprising the at least one match identifier and the encrypted message, at Block 760.

The various blocks shown in FIGS. 6 and 7 may be viewed as method steps, and/or as operations that result from operation of computer program code, and/or as a plurality of coupled logic circuit elements constructed to carry out the associated function(s).

A device operating in a low-power ad hoc network can perform constant searching of other encountered devices and alert the user when something interesting is found. One use for the search is to detect common knowledge between the devices, such as shared interests for example. The users have their interests stored on their devices (either by being added by the user or by having the device gather the interests by some other means, such as by building a profile based on web searches for example). The device uses this information to alert the user when a person with similar interests comes into proximity. The ad hoc network can also be used for communicating with that person, such as setting up an encrypted conversation with the person for example.

The amount of searched and published information can be very large, causing a large amount of traffic on each encounter. Additionally, it may be preferred that only the devices of persons with matching preferences will learn about the common knowledge. If UEs are constantly broadcasting their interests in the clear, a malicious device could passively collect private information just by listening to the transmissions. The collection of this private information can be done by an attacker opportunistically listening to traffic in a single location or systematically in many locations simultaneously.

Exchanging private information over ad hoc networks is problematic. While the traffic may be encrypted so that unintended parties are not able to receive the messages, the establishment of encryption keys should also be performed so that the unintended parties do not gain them. When the encryption keys are to be established in advance, encryption is not possible when the devices have no previous knowledge of each other. That is often the case when two strangers meet and they want to communicate in secret, for example, to exchange contact details.

In order to overcome these problems, various exemplary embodiments describe techniques to discover the existence of common knowledge between two UEs in a privacy-preserving way with minimum traffic, and, following the discovery, securely exchange information between previously unknown devices without requiring user intervention.

Various exemplary embodiments are based on people (unknowingly) having the same pieces of information, such as contact details, Facebook identifiers, etc. for example. These pieces of information are common knowledge items that is first discovered and consequently used to establish an encrypted communication channel. The various exemplary embodiments prevent unwanted third parties from tracking users. The traffic will seem like a random binary stream to a passive attacker, as the transmitted messages do not contain persistent identifiers.

A first exemplary embodiment finds probabilistic keyword matches between devices. Published and queried information is identified by keywords, which are binary strings of varying length. A keyword uniquely identifies the information. Keywords can be based on natural language or they may be, for example, machine-generated identifiers (such as Facebook identifiers, hashtags, metadata, etc. for example). The keyword identifiers are disguised so that only those who know the exactly same information have the same keyword. Using a set of identifiers that are pre-defined ensures the devices use the same presentation for a keyword.

The devices can publish keyword identifiers, such as by using the Publish/Subscribe mechanism of AwareNet, for example. Other devices can then search the published keyword identifiers in order to locate common information. As the number of published keywords can be much larger than what can be queried in the local network, each device queries those keywords that are the most relevant for it. A subset of relevant keywords can be inferred from the current location and calendar time, as well as other contextual information. A device may use a query message to indicate that the device has the information and is searching for devices with shared knowledge/keywords.

The keywords are not sent to the network in plain text, but instead different IDs (identifiers) are generated from the keyword, such as by using a hash function for example. The hash algorithm is selected to be cryptographically strong enough to resist easy reversing, for example, by using a secure hash algorithm (SHA). Salts are added to the keyword prior to hashing in order to produce multiple different hashes, which may then be combined into a large unique string. The bytes in the combined string are then divided for different IDs. The sizes of the IDs are short enough to keep the transmitted messages small, but long enough to make collisions infrequent. Shorter IDs also help to prevent tracking by causing collisions when a passive listener is trying to correlate IDs from different locations.

Each device periodically transmits a query message to the network. The message contains the query IDs of the keywords that the device is searching for. Each keyword has a small set of matching query IDs, from which an ID is randomly chosen for each transmitted message. Multiple IDs may be used because using the same ID each time could allow a passive listener to detect which devices are searching for the same information.

The receiving device has a lookup table containing the query IDs of keywords that the device has published and/or considers relevant. When a query is received, the table is checked to locate any matching keywords. After a (potential) query match is found, the device transmits a response message that contain the match IDs of the matching keywords for that device.

Each device listens for response messages from the network, and checks for matches using a lookup table that contains match IDs of the keywords that the device is interested in (this may be the same lookup table that contains the query IDs or a different lookup table). The match IDs may be different from the query IDs to prevent a passive listener from finding connections between querying and responding devices.

Figure 2:
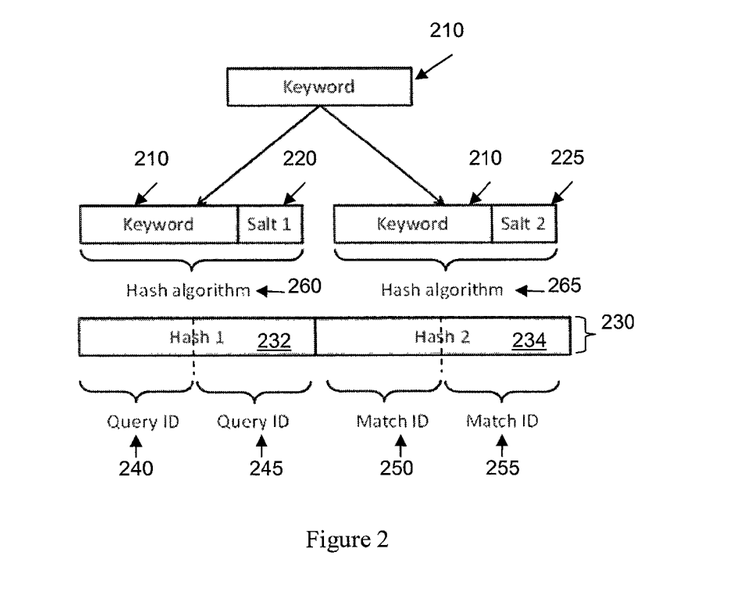
FIG. 2 illustrates the generation of query IDs and match IDs from a keyword in accordance with various exemplary embodiments.

FIG. 2 illustrates the generation of query IDs 240, 245 and match IDs 250, 255 from a keyword 210 in accordance with various exemplary embodiments. Keyword 210 is concatenated with a first salt 220 (such as a query salt for example). The combination is then run through a hash algorithm 260 to create a first hash portion 232. Similarly, keyword 210 is concatenated with a second salt 225 (such as a match salt for example) and then hash algorithm 265 is applied in order to create a second hash portion 234. The two portion 232, 234 are combined, such as by concatenation as a non-limiting example, in order to produce hash 230. Hash algorithm 260 and hash algorithm 265 may be the same or different algorithms. Thus, the sizes of hash portions 232 and hash 234 may also be the same or different.

The combined hash 230 may then be subdivided into smaller components for use as query IDs 240, 245. For example, query IDs 240, 245 may be four byte strings taken from hash 230 which is eight (or more) bytes long. Match IDs 250, 255 are also taken as sub-portions of the combined hash 230.

The salts 220, 225 may be changed periodically and/or derived based on the time. Salts are used so that query IDs and match IDs change over time. If the IDs never changed, an attacker could passively collect IDs and find connections between devices. Also, updating the salts 220, 225 helps to prevent use rainbow tables to detect which keywords users know and to create a fingerprint for the users. Rainbow tables may be used to reverse hashes to the original inputs. Salting makes such reversing time consuming because an attacker would have to reconstruct the rainbow table every time the salt changes. Such tables would be time consuming to create and keep updated for each updated salt. Additionally, updating salts would help avoid situations where a malicious device is replaying queries of other devices as the query IDs would likely no long match with the same keywords.

When using hashing algorithms to generate the query IDs 240, 245 and match IDs 250, 255, the IDs generating for two different keywords may collide on the same hash. Accordingly, a single query ID might match with multiple keywords. Thus, a match can be treated as an indication that there might be somebody in the network that knows the same keyword, but this is not certain due to a possible query ID collision. The receiving device may be configured to send a response message once a certain number of matches are found, such as if five or more matches have been identified, if at least half of the query IDs are matched, etc. for example.

The keyword matches are used to establish an encrypted channel between devices having the same knowledge/keywords, by using a combination of the keywords as the initial secret information. The response message can also include an encrypted payload, and the communication can be continued inside an encrypted channel. The messages are encrypted with a strong symmetric encryption algorithm, such as an advanced encryption standard (AES). A random initialization vector may also be included to make the encrypted portion different in each message.

Figure 3:
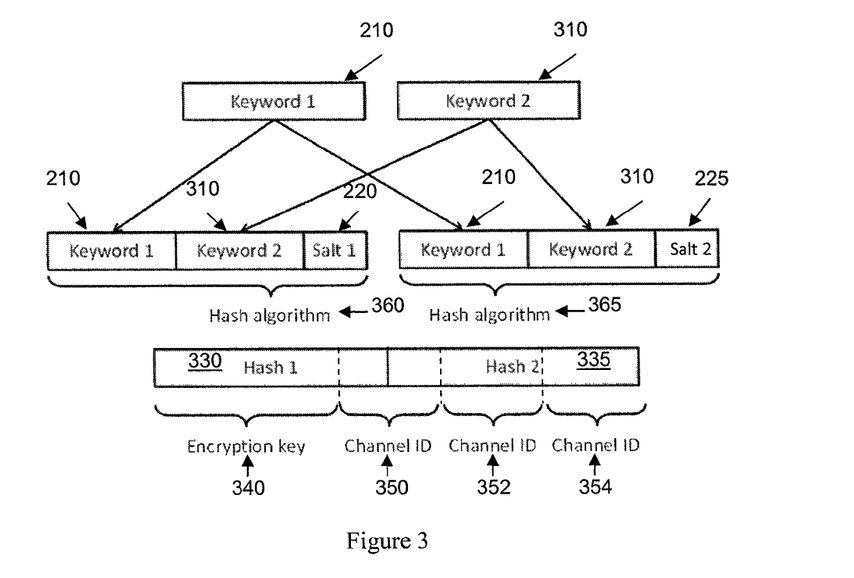
FIG. 3 illustrates the creation of an encryption key and channel IDs from keyword matches in accordance with various exemplary embodiments.

FIG. 3 illustrates the creation of an encryption key 340 and channel IDs 350, 352, 354 from keyword matches in accordance with various exemplary embodiments. In this non-limiting example, two matching keywords 210, 310 are identified. These keywords 210, 310 and salt 1 220 (from the generation of the query IDs 240, 245) are combined (such as by being concatenated for example). The resulting combination is then run through a first, encryption key hash algorithm 360 to create hash 330. The keywords 210, 310 and the second salt 2 225 (from the generation of the match IDs 250, 255) are combined and the resulting combination is then run through a second, encryption key hash algorithm 365 to create hash 335. Note that hash algorithm 360 and hash algorithm 365 may be the same or different algorithms.

Hash 330 and hash 335 are combined (such as by being concatenated for example). The combination is then subdivided into an encryption key 340 and channel IDs 350, 352, 354. The sizes of the channel IDs 350, 352, 354 may be the same or different.

The encryption key is derived from the matching subset of keywords with hashing, as presented in FIG. 3. The keywords are sorted (such as in ascending order for example) so that each device produces the same hash. A longer hash string is produced in a similar way as the IDs. The encryption key is extremely difficult to derive from the query IDs without knowing the keywords used. To continue communication on the channel after the response message, each further message contains a channel ID that identifies the encrypted channel the message belongs to. To save energy, the devices can create multiple channel IDs in advance. Then, the devices can use a lookup table when receiving further message rather than creating new channel IDs.

Various exemplary embodiments enable efficient detection of common knowledge between devices. This detection can be done in the background. The devices can also automatically establish a secure channel, all without user intervention. By sending IDs of the keywords, each of which may be only a few bytes long, the background traffic is kept small (before a communication channel is established between devices sharing keywords) and depends on the number of searched items. The techniques discussed may also be applied in various network settings and does not require the devices to be in close physical proximity.

An alternative exemplary embodiment is to use each keyword a device holds as a seed for a community. The other devices could then use a community pseudonyms mechanism as well as the community search message for discovery of common interests and subsequent encrypted communication. The community search message may serve as the keyword query message and the community pseudonyms may act as the Query IDs.

In another exemplary embodiment, the common interest identifying protocol of the embodiment is stateless. Thus, a query may be shared between devices. Then, when a first device notices that another device is querying the same keywords. The device can watch for responses to the other device's queries which allows the first device to query those shared keywords less frequently and use its queries to search for other keywords instead.

Also, the stateless protocol allows a device to interpret response messages without sending or receiving the preceding query messages. When receiving a response message, the device checks the match IDs against keywords in the appropriate look up table. The look up table may include keywords which were not published by the device, for example, when those keywords have been detected in queries by another device.

In a further exemplary embodiment, the probability of an ID collision depends on the total number of unique keywords in the network. If the number of potential keywords was 10,000, using three byte IDs may cause about six collisions on average, while using four byte IDs would cause less than one collision on the average. Accordingly, the allowed sizes of the query IDs and match IDs may be based on the total number of potential keywords.

If the size of a query ID was four bytes, and the number of searched keywords was 100, the size of the query message would be 400 bytes. The amount of traffic can be further decreased by only sending messages when the network state is changed, such as when another user is added for example. Alternatively, the query messages may be provided periodically with a long enough period to avoid overtaxing the network traffic.

In another exemplary embodiment where collisions of match IDs are possible, a receiving device may try to decrypt messages with the encryption keys of every possible matching combination of keywords. On the other hand, if the matching keywords are reported (such as by using unique match IDs), there is no need to check different combinations. If the device can successfully decrypt the message, it knows that another device in the ad hoc network has the same subset of keywords.

In a further exemplary embodiment, the various transmitted messages are restricted from having any persistent identifiers, such as network addresses, device IDs or other nick names. Such persistent identifiers would allow a passive listener to construct a fingerprint for each user/device. The fingerprint would allow recognizing the same device again, even at a different location. To solve the problem, the salts 220, 225 may be altered periodically to change the generated IDs. The change interval dictates how long the listener can follow the same person or a keyword. The salts 220, 225 may be based on the current time, which is assumed to be available in each device. Each device generates the salts 220, 225 using the same method so that the independently created IDs for a given keyword (such as query IDs 240, 245) are identical across the various devices.

In another exemplary embodiment, the encryption key 340 for the payload 426 may also be based on the concatenation of two random nonces, R_A and R_B. Each nonce is a random string of bits. Query message 410 may also include a first nonce, R_A, and the response message 420 may include a second nonce, R_B. The nonces R_A and R_B bind the query 410 with the response 420. While the nonces may not add additional security (for example, when sent using plain text), adding the nonces prevents replaying of either Alice's query 410, or Bob's response 420 by an attacker, against another device. When generating the encryption key 340, the nonces may be combined with the matching keywords 210, 310 before hashing. Alternatively, the nonces may be combined with the hashes 330, 335.

In a further exemplary embodiment, the messages may be broadcast when there are multiple devices present in the network. Broadcasting further decreases the amount of traffic (as compared to individually sending the messages to each device) and improves privacy. All messages in the protocol can be sent by broadcast, and any device can send a reply broadcast. Broadcasting allows the devices to not have network addresses in order to avoid having trackable identifiers in the transmitted messages. If the network is large enough, a malicious user cannot determine which device each broadcast message originated from in order to find connections between devices and to create a fingerprint for that device.

In another exemplary embodiment, each channel may have multiple matching channel IDs. In this case, a random ID may be chosen from the set of matching channel IDs each time a message is transmitted over that particular channel. Each device knows to expect messages with any one of the multiple channel IDs after seeing a response message.

Conventional secure set intersection protocols may be used to find common knowledge between two parties without revealing the knowledge set of either party. However, these protocols are not practical of ad hoc networks because of the high volume of data even before a match is found. In contrast, various exemplary embodiments enable multiple devices to use a low volume communication in order to find common knowledge.

Using the conventional secure set intersection protocols also involves heavy computations which are not preferred in mobile devices due to limited processor speed and the energy consumption of the computations (which drains the battery). The various exemplary embodiments use computationally lighter algorithms, which are suitable for mobile devices and AwareNet communication.

Another conventional method used to establish a wireless trusted channel between previously unknown mobile devices is to have an auxiliary channel that an attacker cannot control or easy intercept. The use of an auxiliary channel for key management may involve copying a PIN code between the devices using a short-range communication link, such as infrared or NFC. This is not practical for ad-hoc communication networks between unknown devices may be physically separated by hundreds of meters (such as is possible in an AwareNet using multiple-hops for example).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with various exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

An exemplary embodiment provides a method for establishing an encrypted communication channel in an ad hoc network based on user interest data. The method includes generating (such as by a processor for example) at least one query ID based on a first set of keywords. Each query ID identifies a keyword of the first set of keywords. The method includes receiving (such as by a receiver for example), in an ad hoc network, a response including at least one match ID and an encrypted message. Each match ID identifies a keyword. The method includes determining (such as by a processor for example) a subset of keywords based on the at least one match ID. The subset of keywords includes keywords of the first set of keywords identified by the at least one match ID. The method also includes generating (such as by a processor for example) an encryption key based on the subset of keywords and decrypting (such as by a processor for example) the encrypted message using the encryption key.

In a further exemplary embodiment of the method above, the method also includes sending, to the ad hoc network, a query including the at least one query ID. Receiving the response is performed in response to sending the query. Sending the query may include broadcasting the query.

In another exemplary embodiment of any one of the methods above, the method also includes generating a first cryptographic nonce. The query also includes the first cryptographic nonce. The response may also include a second cryptographic nonce. Generating the encryption key may be also based on the first cryptographic nonce and the second cryptographic nonce.

In a further exemplary embodiment of any one of the methods above, the method also includes selecting the first set of keywords.

In another exemplary embodiment of any one of the methods above, the method also includes receiving a received query identifying a second set of keywords, selecting a third set of keywords. The third set of keywords includes keywords from the first set of keywords and not in the second set of keywords. The method also includes sending, to the ad hoc network, a transmitted query including at least one query ID for keywords in the third set of keywords. Each of the at least one query ID identifies a keyword of the third set of keywords.

In a further exemplary embodiment of any one of the methods above, generating a query ID for a keyword includes: generating a query salt; combining the keyword and the query salt to create a first combination; hashing the first combination to create a first hash; and dividing the first hash into one or more query IDs. Generating the query salt may be based on a current time.

In another exemplary embodiment of any one of the methods above, combining the keyword and the query salt includes concatenating the keyword and the query salt. In an alternative embodiment, combining the keyword and the query salt includes interweaving bytes/bits of the keyword and the query salt.

In a further exemplary embodiment of any one of the methods above, generating the encryption key includes: combining each keyword in the subset of keywords to create a key combination; hashing the key combination to create a key hash; and dividing the key hash into the encryption key and one or more channel IDs. Combining each keyword in the subset of keywords may include concatenating each keyword in the subset of keywords. In an alternative embodiment, combining each keyword in the subset of keywords includes interweaving bytes/bits of each keyword in the subset of keywords.

In another exemplary embodiment of any one of the methods above, determining the subset of keywords includes: for each match ID of the at least one match ID, determining whether a look up table includes an associated keywords for the match ID, and, in response to determining that the look up table includes an associated keyword, adding the associated keyword to the subset of keywords.

A further exemplary embodiment provides a method for establishing an encrypted communication channel in an ad hoc network based on user interest data. The method includes receiving (such as by a receiver for example), in an ad hoc network, a query including at least one query ID. Each query ID identifies a keyword. In response to receiving the query, the method includes determining (such as by a processor for example) a subset of keywords from a first set of keywords based on the at least one query ID. The subset of the first set of keywords includes keywords of the first set of keywords which are identified by the at least one query ID. The method includes determining (such as by a processor for example) at least one match ID based on the subset of keywords. Each match ID identifies a keyword of the subset of keywords. The method includes generating (such as by a processor for example) an encryption key based on the subset of keywords. The method also includes encrypting (such as by a processor for example) a message using the encryption key and sending (such as by a transmitter for example) a response including the at least one match ID and the encrypted message.

In another exemplary embodiment of the method above, the query also includes a first cryptographic nonce. The method also includes generating a second cryptographic nonce. Generating the encryption key is also based on the first cryptographic nonce and the second cryptographic nonce. The response also includes the second cryptographic nonce.

In a further exemplary embodiment of any one of the methods above, determining the at least one match ID is performed in response to a determination that the subset of keywords includes at least a threshold number of keywords. The threshold number may be defined as set number (such as five keywords for example), as a given portion of the number of keywords in a query message (such as half the number of keywords in the query message for example), or as a combination of the two (such as a least five keywords matched or at least half the number of keywords in the query message match for example).

In another exemplary embodiment of any one of the methods above, determining the at least one match ID includes generating the at least one match ID.

In a further exemplary embodiment of any one of the methods above, determining the at least one match ID includes retrieving the at least one match ID from a look up table.

In another exemplary embodiment of any one of the methods above, sending the response includes broadcasting the response.

In a further exemplary embodiment of any one of the methods above, generating a match ID for a keyword includes: generating a match salt; combining the keyword and the match salt to create a second combination; hashing the second combination to create a second hash; and dividing the second hash into one or more match IDs. Generating the match salt may be based on a current time.

In another exemplary embodiment of any one of the methods above, combining the keyword and the match salt includes concatenating the keyword and the response salt. In an alternative embodiment, combining the keyword and the match salt includes interweaving bytes/bits of the keyword and the match salt.

In a further exemplary embodiment of any one of the methods above, generating the encryption key includes: combining each keyword in the subset of keywords to create a key combination; hashing the key combination to create a key hash; and dividing the key hash into the encryption key and one or more channel IDs.

In another exemplary embodiment of any one of the methods above, combining each keyword in the subset of keywords includes concatenating each keyword in the subset of keywords. In an alternative embodiment, combining each keyword in the subset of keywords includes interweaving bytes/bits of each keyword in the subset of keywords.

A further exemplary embodiment provides an apparatus for establishing an encrypted communication channel in an ad hoc network based on user interest data. The apparatus includes at least one processor (such as DP 514, 515 for example); and at least one memory (such as MEM 516 for example) including computer program code (such as PROG 518 for example). The at least one memory and the computer program code are configured to, with the at least one processor, cause the apparatus to perform actions. The actions include to generate at least one query ID based on a first set of keywords. Each query ID identifies a keyword of the first set of keywords. The actions include to receive, in an ad hoc network, a response including at least one match ID and an encrypted message. Each match ID identifies a keyword. The actions include to determine a subset of keywords based on the at least one match ID. The subset of keywords includes keywords of the first set of keywords identified by the at least one match ID. The actions also include to generate an encryption key based on the subset of keywords and to decrypt the encrypted message using the encryption key.

In another exemplary embodiment of the apparatus above, the at least one memory and the computer program code are also configured to cause the apparatus to send, to the ad hoc network, a query including the at least one query ID. Receiving the response is performed in response to sending the query. When sending the query, the at least one memory and the computer program code may also be configured to cause the apparatus to broadcast the query.

In a further exemplary embodiment of any one of the apparatus above, the at least one memory and the computer program code are also configured to cause the apparatus to generate a first cryptographic nonce. The query also includes the first cryptographic nonce. The response may also include a second cryptographic nonce, and generating the encryption key may also be based on the first cryptographic nonce and the second cryptographic nonce.

In another exemplary embodiment of any one of the apparatus above, the at least one memory and the computer program code are also configured to cause the apparatus to select the first set of keywords.

In a further exemplary embodiment of any one of the apparatus above, the at least one memory and the computer program code are also configured to cause the apparatus: to receive a received query identifying a second set of keywords; and to select a third set of keywords. The third set of keywords includes keywords from the first set of keywords and not in the second set of keywords. The at least one memory and the computer program code are also configured to cause the apparatus to send, to the ad hoc network, a transmitted query including at least one query ID for keywords in the third set of keywords. Each of the at least one query ID identifies a keyword of the third set of keywords.

In another exemplary embodiment of any one of the apparatus above, when generating a query ID for a keyword, the at least one memory and the computer program code are also configured to cause the apparatus: to generate a query salt; to combine the keyword and the query salt to create a first combination; to hash the first combination to create a first hash; and to divide the first hash into one or more query IDs. Generating the query salt may be based on a current time. When combining the keyword and the query salt, the at least one memory and the computer program code may also be configured to cause the apparatus to concatenate the keyword and the query salt.

In a further exemplary embodiment of any one of the apparatus above, when generating the encryption key, the at least one memory and the computer program code are also configured to cause the apparatus: to combine each keyword in the subset of keywords to create a key combination; to hash the key combination to create a key hash; and to divide the key hash into the encryption key and one or more channel IDs. When combining each keyword in the subset of keywords, the at least one memory and the computer program code may also be configured to cause the apparatus to concatenate each keyword in the subset of keywords.

In another exemplary embodiment of any one of the apparatus above, when determining the subset of keywords, the at least one memory and the computer program code are also configured to cause the apparatus, for each match ID of the at least one match ID, to determine whether a look up table includes an associated keywords for the match ID, and, in response to determining that the look up table includes an associated keyword, to add the associated keyword to the subset of keywords.

In a further exemplary embodiment of any one of the apparatus above, the apparatus is embodied in a mobile device.

In another exemplary embodiment of any one of the apparatus above, the apparatus is embodied in an integrated circuit.

A further exemplary embodiment provides an apparatus for establishing an encrypted communication channel in an ad hoc network based on user interest data. The apparatus includes at least one processor (such as DP 524, 525 for example); and at least one memory (such as MEM 526 for example) including computer program code (such as PROG 528 for example). The at least one memory and the computer program code are configured to, with the at least one processor, cause the apparatus to perform actions. The actions include to receive, in an ad hoc network, a query including at least one query ID. Each query ID identifies a keyword. In response to receiving the query, the actions include to determine a subset of keywords from a first set of keywords based on the at least one query ID. The subset of the first set of keywords includes keywords of the first set of keywords which are identified by the at least one query ID. The actions include to determine at least one match ID based on the subset of keywords. Each match ID identifies a keyword of the subset of keywords. The actions include to generate an encryption key based on the subset of keywords.

The actions also include to encrypt a message using the encryption key and to send a response including the at least one match ID and the encrypted message.

In another exemplary embodiment of the apparatus above, the query also includes a first cryptographic nonce. The at least one memory and the computer program code are also configured to cause the apparatus to generate a second cryptographic nonce. Generating the encryption key is also based on the first cryptographic nonce and the second cryptographic nonce. The response also includes the second cryptographic nonce.

In a further exemplary embodiment of any one of the apparatus above, determining the at least one match ID is performed in response to a determination that the subset of keywords includes at least a threshold number of keywords. The threshold number may be defined as set number (such as five keywords for example), as a given portion of the number of keywords in a query message (such as half the number of keywords in the query message for example), or as a combination of the two (such as a least five keywords matched or at least half the number of keywords in the query message match for example).

In another exemplary embodiment of any one of the apparatus above, when determining the at least one match ID, the at least one memory and the computer program code are also configured to cause the apparatus to generate the at least one match ID.

In a further exemplary embodiment of any one of the apparatus above, when determining the at least one match ID, the at least one memory and the computer program code are also configured to cause the apparatus to retrieve the at least one match ID from a look up table.

In another exemplary embodiment of any one of the apparatus above, when sending the response, the at least one memory and the computer program code are also configured to cause the apparatus to broadcast the response.

In a further exemplary embodiment of any one of the apparatus above, when generating a match ID for a keyword, the at least one memory and the computer program code are also configured to cause the apparatus: to generate a match salt; to combine the keyword and the match salt to create a second combination; to hash the second combination to create a second hash; and to divide the second hash into one or more match IDs. Generating the match salt may be based on a current time. When combining the keyword and the match salt, the at least one memory and the computer program code may also be configured to cause the apparatus to concatenate the keyword and the response salt.

In another exemplary embodiment of any one of the apparatus above, when generating the encryption key, the at least one memory and the computer program code are also configured to cause the apparatus: to combine each keyword in the subset of keywords to create a key combination; to hash the key combination to create a key hash; and to divide the key hash into the encryption key and one or more channel IDs. When combining each keyword in the subset of keywords, the at least one memory and the computer program code may also be configured to cause the apparatus to concatenate each keyword in the subset of keywords.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides a computer readable medium for establishing an encrypted communication channel in an ad hoc network based on user interest data. The computer readable medium (such as MEM 516 for example) is tangibly encoded with a computer program (such as PROG 518 for example) executable by a processor (such as DP 514, 515 for example) to perform actions. The actions include generating at least one query ID based on a first set of keywords. Each query ID identifies a keyword of the first set of keywords. The actions include receiving, in an ad hoc network, a response including at least one match ID and an encrypted message. Each match ID identifies a keyword. The actions include determining a subset of keywords based on the at least one match ID. The subset of keywords includes keywords of the first set of keywords identified by the at least one match ID. The actions also include generating an encryption key based on the subset of keywords and decrypting the encrypted message using the encryption key.

In a further exemplary embodiment of the computer readable medium above, the actions also include sending, to the ad hoc network, a query including the at least one query ID. Receiving the response is performed in response to sending the query. Sending the query may include broadcasting the query.

In another exemplary embodiment of any one of the computer readable media above, the actions also include generating a first cryptographic nonce. The query also includes the first cryptographic nonce. The response may also include a second cryptographic nonce. Generating the encryption key is also based on the first cryptographic nonce and the second cryptographic nonce.

In a further exemplary embodiment of any one of the computer readable media above, the actions also include selecting the first set of keywords.

In another exemplary embodiment of any one of the computer readable media above, the actions also include: receiving a received query identifying a second set of keywords and selecting a third set of keywords. The third set of keywords includes keywords from the first set of keywords and not in the second set of keywords. The actions also include sending, to the ad hoc network, a transmitted query including at least one query ID for keywords in the third set of keywords. Each of the at least one query ID identifies a keyword of the third set of keywords.

In a further exemplary embodiment of any one of the computer readable media above, generating a query ID for a keyword includes: generating a query salt; combining the keyword and the query salt to create a first combination; hashing the first combination to create a first hash; and dividing the first hash into one or more query IDs. Generating the query salt may be based on a current time. Combining the keyword and the query salt may include concatenating the keyword and the query salt.

In another exemplary embodiment of any one of the computer readable media above, generating the encryption key includes: combining each keyword in the subset of keywords to create a key combination; hashing the key combination to create a key hash; and dividing the key hash into the encryption key and one or more channel IDs. Combining each keyword in the subset of keywords may include concatenating each keyword in the subset of keywords.

In a further exemplary embodiment of any one of the computer readable media above, determining the subset of keywords includes, for each match ID of the at least one match ID, determining whether a look up table includes an associated keywords for the match ID, and, in response to determining that the look up table includes an associated keyword, adding the associated keyword to the subset of keywords.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides a computer readable medium for establishing an encrypted communication channel in an ad hoc network based on user interest data. The computer readable medium (such as MEM 526 for example) is tangibly encoded with a computer program (such as PROG 528 for example) executable by a processor (such as DP 524, 525 for example) to perform actions. The actions include receiving, in an ad hoc network, a query including at least one query ID. Each query ID identifies a keyword. In response to receiving the query, the actions include determining a subset of keywords from a first set of keywords based on the at least one query ID. The subset of the first set of keywords includes keywords of the first set of keywords which are identified by the at least one query ID. The actions include determining at least one match ID based on the subset of keywords. Each match ID identifies a keyword of the subset of keywords. The actions include generating an encryption key based on the subset of keywords. The actions also include encrypting a message using the encryption key and sending a response including the at least one match ID and the encrypted message.

In a further exemplary embodiment of the computer readable medium above, the query also includes a first cryptographic nonce. The actions also include generating a second cryptographic nonce. Generating the encryption key is also based on the first cryptographic nonce and the second cryptographic nonce. The response also includes the second cryptographic nonce.

In another exemplary embodiment of any one of the computer readable media above, determining the at least one match ID is performed in response to a determination that the subset of keywords includes at least a threshold number of keywords. The threshold number may be defined as set number (such as five keywords for example), as a given portion of the number of keywords in a query message (such as half the number of keywords in the query message for example), or as a combination of the two (such as a least five keywords matched or at least half the number of keywords in the query message match for example).

In a further exemplary embodiment of any one of the computer readable media above, determining the at least one match ID includes generating the at least one match ID.

In another exemplary embodiment of any one of the computer readable media above, determining the at least one match ID includes retrieving the at least one match ID from a look up table.

In a further exemplary embodiment of any one of the computer readable media above, sending the response includes broadcasting the response.

In another exemplary embodiment of any one of the computer readable media above, generating a match ID for a keyword includes: generating a match salt; combining the keyword and the match salt to create a second combination; hashing the second combination to create a second hash; and dividing the second hash into one or more match IDs. Generating the match salt may be based on a current time. Combining the keyword and the match salt may include concatenating the keyword and the response salt.

In a further exemplary embodiment of any one of the computer readable media above, generating the encryption key includes: combining each keyword in the subset of keywords to create a key combination; hashing the key combination to create a key hash; and dividing the key hash into the encryption key and one or more channel IDs. Combining each keyword in the subset of keywords includes concatenating each keyword in the subset of keywords.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides an apparatus for establishing an encrypted communication channel in an ad hoc network based on user interest data. The apparatus includes means for generating (such as a processor for example) at least one query ID based on a first set of keywords. Each query ID identifies a keyword of the first set of keywords. The apparatus includes means for receiving (such as a receiver for example), in an ad hoc network, a response including at least one match ID and an encrypted message. Each match ID identifies a keyword. The apparatus includes means for determining (such as a processor for example) a subset of keywords based on the at least one match ID. The subset of keywords includes keywords of the first set of keywords identified by the at least one match ID. The apparatus also includes means for generating (such as a processor for example) an encryption key based on the subset of keywords and means for decrypting (such as a processor for example) the encrypted message using the encryption key.

In a further exemplary embodiment of the apparatus above, the apparatus also includes means for sending, to the ad hoc network, a query including the at least one query ID. Receiving the response is performed in response to sending the query. The sending means may include means for broadcasting the query.

In another exemplary embodiment of any one of the apparatus above, the apparatus also means for generating a first cryptographic nonce. The query also includes the first cryptographic nonce. The response may also include a second cryptographic nonce, and generating the encryption key is also based on the first cryptographic nonce and the second cryptographic nonce.

In a further exemplary embodiment of any one of the apparatus above, the apparatus also means for selecting the first set of keywords.

In another exemplary embodiment of any one of the apparatus above, the apparatus also includes: means for receiving a received query identifying a second set of keywords; and means for selecting a third set of keywords. The third set of keywords includes keywords from the first set of keywords and not in the second set of keywords. The apparatus also includes means for sending, to the ad hoc network, a transmitted query including at least one query ID for keywords in the third set of keywords. Each of the at least one query ID identifies a keyword of the third set of keywords.

In a further exemplary embodiment of any one of the apparatus above, the query ID generating means includes: means for generating a query salt; means for combining the keyword and the query salt to create a first combination;

means for hashing the first combination to create a first hash; and means for dividing the first hash into one or more query IDs. Generating the query salt may be based on a current time. The combining means may include means for concatenating the keyword and the query salt.

In another exemplary embodiment of any one of the apparatus above, the encryption key generating means includes: means for combining each keyword in the subset of keywords to create a key combination; means for hashing the key combination to create a key hash; and means for dividing the key hash into the encryption key and one or more channel IDs. The combining means may include means for concatenating each keyword in the subset of keywords.

In a further exemplary embodiment of any one of the apparatus above, the subset of keywords determining means includes means for determining, for each match ID of the at least one match ID, whether a look up table includes an associated keywords for the match ID, and means for adding the associated keyword to the subset of keywords in response to determining that the look up table includes an associated keyword.

Another exemplary embodiment provides an apparatus for establishing an encrypted communication channel in an ad hoc network based on user interest data. The apparatus includes means for receiving (such as a receiver for example), in an ad hoc network, a query including at least one query ID. Each query ID identifies a keyword. The apparatus includes means for determining (such as a processor for example) a subset of keywords from a first set of keywords based on the at least one query ID in response to receiving the query. The subset of the first set of keywords includes keywords of the first set of keywords which are identified by the at least one query ID. The apparatus includes means for determining (such as a processor for example) at least one match ID based on the subset of keywords. Each match ID identifies a keyword of the subset of keywords. The apparatus includes means for generating (such as a processor for example) an encryption key based on the subset of keywords. The apparatus also includes means for encrypting (such as a processor for example) a message using the encryption key and means for sending (such as a transmitter for example) a response including the at least one match ID and the encrypted message.

In a further exemplary embodiment of any one of the apparatus above, the query also includes a first cryptographic nonce. The apparatus also includes means for generating a second cryptographic nonce. Generating the encryption key is also based on the first cryptographic nonce and the second cryptographic nonce. The response also includes the second cryptographic nonce.

In another exemplary embodiment of any one of the apparatus above, determining the at least one match ID is performed in response to a determination that the subset of keywords includes at least a threshold number of keywords. The threshold number may be defined as set number (such as five keywords for example), as a given portion of the number of keywords in a query message (such as half the number of keywords in the query message for example), or as a combination of the two (such as a least five keywords matched or at least half the number of keywords in the query message match for example).

In a further exemplary embodiment of any one of the apparatus above, the at least one match ID determining means includes means for generating the at least one match ID.

In another exemplary embodiment of any one of the apparatus above, the at least one match ID determining means includes means for retrieving the at least one match ID from a look up table.

In a further exemplary embodiment of any one of the apparatus above, the response sending means includes means for broadcasting the response.

In another exemplary embodiment of any one of the apparatus above, the match ID generating means includes: means for generating a match salt; means for combining the keyword and the match salt to create a second combination; means for hashing the second combination to create a second hash; and means for dividing the second hash into one or more match IDs. Generating the match salt may be based on a current time. The combining means may include means for concatenating the keyword and the response salt.

In a further exemplary embodiment of any one of the apparatus above, the encryption key generating means includes: means for combining each keyword in the subset of keywords to create a key combination; means for hashing the key combination to create a key hash; and means for dividing the key hash into the encryption key and one or more channel IDs. The combining means may include means for concatenating each keyword in the subset of keywords.

Further, the various names used for the described parameters (e.g., Query ID, Match ID, etc.) are not intended to be limiting in any respect, as these parameters may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

What is claimed is:

1. A method comprising:
generating, at a first device, at least one query identifier based on a first set of keywords, wherein each query identifier comprises a first hash of an identified keyword from the first set of keywords;
transmitting, to at least a second device, a query comprising the at least one query identifier, wherein the query is transmitted via an ad hoc network;
receiving, from the second device, a response comprising at least one match identifier and an encrypted message, wherein each match identifier comprises a second hash of the identified keyword that the second device is able to identify based on the at least one query identifier;
determining, at the first device, one or more keywords from the first set of keywords that corresponds to the at least one match identifier;
generating an encryption key based on the one or more keywords identified by the at least one match identifier; and
decrypting the encrypted message using the encryption key.

2. The method of claim 1, further comprising:
generating, by the first device, a first cryptographic nonce; and
generating the query to include the first cryptographic nonce.

3. The method of claim 2, wherein the response from the second device further comprises a second cryptographic nonce, and wherein the first device generates the encryption key further-based on the first cryptographic nonce and the second cryptographic nonce.

4. The method of claim 1, further comprising:
receiving a first query identifying a second set of keywords;
selecting a third set of keywords, wherein the third set of keywords includes keywords from the first set of keywords that are not in the second set of keywords; and
transmitting, to at least the second device, a second query comprising at least one query identifier corresponding to keywords in the third set of keywords, wherein each of the at least one query identifier identifies a keyword from the third set of keywords.

5. The method of claim 1, wherein generating the at least one query identifier includes:
generating a query salt;
combining the keyword and the query salt to create a first combination;
hashing the first combination to create the first hash; and
dividing the first hash into one or more query identifiers.

6. The method of claim 1, wherein generating the encryption key includes:
combining the one or more keywords to create a key combination;
hashing the key combination to create a key hash; and
dividing the key hash into the encryption key and one or more channel identifiers.

7. An apparatus, comprising:
at least one processor; and
at least one non-transitory computer-readable medium including computer program code which when executed by the at least one processor causes the apparatus to at least:
generate at least one query identifier based on a first set of keywords, wherein each query identifier comprises a first hash of an identified keyword from the first set of keywords;
transmit, to at least one other apparatus, a query comprising the at least one query identifier, wherein the query is transmitted via an ad hoc network;
receive, from the other apparatus, a response comprising at least one match identifier and an encrypted message, wherein each match identifier comprises a second hash of the identified keyword that the other apparatus is able to identify based on the at least one query identifier;
determine one or more keywords from the first set of keywords that corresponds to the at least one match identifier;
generate an encryption key based on the one or more keywords identified by the at least one match identifier; and
decrypt the encrypted message using the encryption key.

8. The apparatus of claim 7, wherein the apparatus is further configured to at least:
generate a first cryptographic nonce; and
generate the query to include the first cryptographic nonce.

9. The apparatus of claim 8, wherein the response from the other apparatus further comprises a second cryptographic nonce, and wherein the first device generates the encryption key further based on the first cryptographic nonce and the second cryptographic nonce.

10. The apparatus of claim 7, wherein the apparatus is further configured to at least:
receive a first query identifying a second set of keywords;
select a third set of keywords, wherein the third set of keywords includes keywords from the first set of keywords that are not in the second set of keywords; and
transmit, to at least the other apparatus, a second query comprising at least one query identifier corresponding to keywords in the third set of keywords, wherein each of the at least one query identifier identifies a keyword from the third set of keywords.

11. The apparatus of claim 7, wherein the generating of the at least one query identifier further causes the apparatus at least:
generate a query salt;
combine the keyword and the query salt to create a first combination;
hash the first combination to create the first hash; and
divide the first hash into one or more query identifiers.

12. The apparatus of claim 11, wherein the combining of the keyword and the query salt further causes the apparatus to at least concatenate the keyword and the query salt.

13. The apparatus of claim 7, wherein the generating of the encryption key further causes the apparatus to at least:
combine the one or more keywords to create a key combination;
hash the key combination to create a key hash; and
divide the key hash into the encryption key and one or more channel identifiers.

14. The apparatus of claim 7, wherein the determining of the one or more keywords from the first set of keywords causes the apparatus to at least:
locate, in a lookup table, the at least one match identifier, wherein the look up table comprises a plurality of match identifiers and a corresponding plurality of keywords.

15. An apparatus, comprising:
at least one processor; and
non-transitory computer-readable medium including computer program code which when executed by the at least one processor causes the apparatus to at least:
receive, from another apparatus, a query comprising at least one query identifier, wherein each query identifier comprises a first hash of an identified keyword from a first set of keywords, and wherein the query is received via an ad hoc network;
determine, in response to receiving the query, one or more keywords identified by the first hash of the at least one query identifier;
determine at least one match identifier corresponding to the one or more keywords, wherein each match identifier comprises a second hash of one of the one or more identified keywords;
generate, based at least in part on the one or more keywords used to determine the at least one match identifier, an encryption key;
encrypt a message using the encryption key; and
send, to the other apparatus, a response comprising the at least one match identifier and the encrypted message, wherein the other apparatus is able to identify the one or more keywords used to generate the encryption key by the at least one match identifier.

16. The apparatus of claim 15, wherein the query received from the other apparatus further comprises a first cryptographic nonce, wherein the apparatus is further configured to generate a second cryptographic nonce, generate the encryption key further based on the first cryptographic nonce and the second cryptographic nonce, and include the second cryptographic nonce in the response to the other apparatus.

17. The apparatus of claim 15, wherein the generating of the match identifier causes the apparatus to at least:
- generate a match salt;
- combine a keyword from the first set of keywords and the match salt to create a second combination;
- hash the second combination to create the second hash; and
- divide the second hash into the at least the match identifier.

18. The apparatus of claim 17, wherein the combination of the keyword and the match salt further causes the apparatus to at least concatenate the keyword and the response salt.

19. The apparatus of claim 15, wherein the generating of the encryption key further causes the apparatus to at least:
- combine the one or more keywords;
- hash the key combination to create a key hash; and
- divide the key hash into the encryption key and one or more channel identifiers.

20. The apparatus of claim 19, wherein the combination of the one or more keywords causes the apparatus to at least concatenate the one or more keywords.

* * * * *